Dec. 15, 1942.                M. D. McCARTY                  2,305,543
                    EXPANDER FOR ELECTRICAL SEISMOGRAPHS
                           Filed Feb. 5, 1941
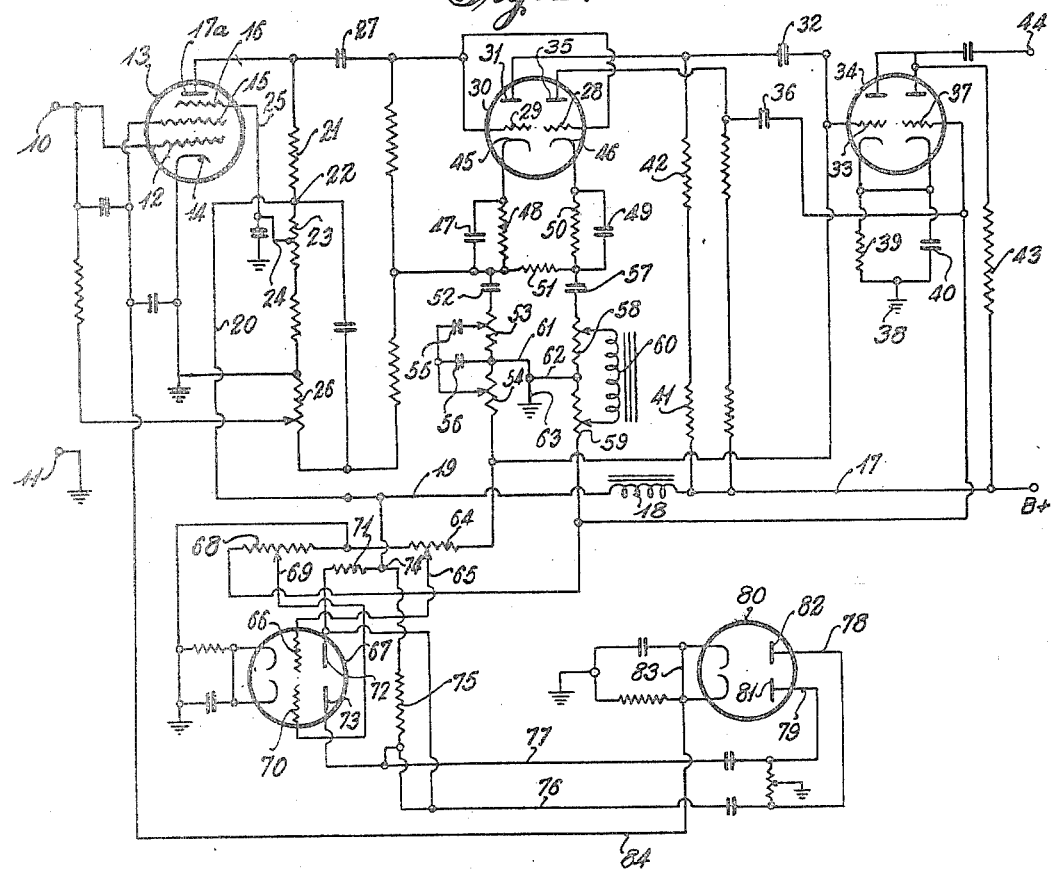
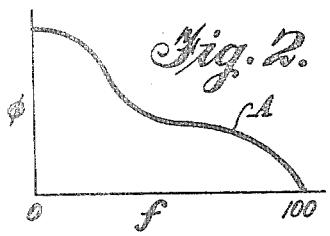
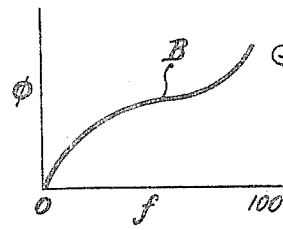
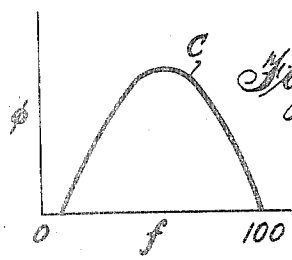
Inventor
Malcolm D. McCarty
By Dallas R. Lamont
Attorney Patented Dec. 15, 1942

2,305,543

UNITED STATES PATENT OFFICE 2,305,543

EXPANDER FOR ELECTRICAL SEISMO-GRAPHS

Malcolm D. McCarty, Dallas, Tex., assignor, by mesne assignments, to Socony-Vacuum Oil Company, Incorporated, New York, N. Y., a corporation of New York Application February 5, 1941, Serial No. 377,461

1 Claim. (Cl. 177—352)

This invention relates generally to geophysical prospecting and more particularly to a method and apparatus for recording seismic waves.

It has long been known to those skilled in the art that a detail profile can be made of the interfaces of the subsurface strata from data obtained by detecting, amplifying and recording seismic waves. These detected seismic waves can be either reflected or refracted. The instant invention, however, is directed to the detecting, amplifying and recording of reflected waves. Experience has taught that the frequency of reflected waves ranges between 40 and 60 cycles and for the greater part are very close to 50 cycles. Therefore, for best results it is desirable to have apparatus which will discriminate between different frequencies of detected waves.

In the art of seismic prospecting the customary procedure is to detonate a charge of explosives at or near the surface of the earth and at a point removed therefrom detect, amplify and record the waves reflected from the interfaces of subsurface strata. Since a complex train of waves is created by the detonation of the charge of explosives that radiates in all directions from the shot, it is necessary that waves of undesirable frequencies be eliminated and those which are reflected from the interfaces of the substrata which carry the most energy be emphasized. Therefore, the obvious manner for discriminating between these waves is to modify the characteristics of the amplifier used to amplify the detected waves before recording them.

Therefore, the primary object of this invention resides in the provision of means for modifying the characteristics of a seismic amplifier in such a manner that waves of a selected frequency range will produce an expansion in the gain in amplification as derived from the amplifier and at the same time lessen the effect of waves of undesirable frequencies.

Another object of this invention resides in the provision of an amplifier for amplifying detected seismic waves that utilizes the principle of inverse feed-back for producing an expansion in the gain in amplification imparted to waves of selected frequencies.

Still another object of this invention resides in the provision of a method of recording reflected seismic waves of frequencies in the neighborhood of 50 cycles, in such a manner that reflected waves from the interfaces of substrata will be recorded at substantially the same amplitude.

A further object of this invention resides in the provision of a method of controlling the gain in amplification as derived from a seismograph amplifier in such a manner that the gain in amplification imparted to waves of selected frequency will be dependent upon the energy in the selected frequency waves.

Other objects and advantages of this invention will become apparent from the following detailed description, when considered with the accompanying drawing in which:

Figure 1 is a circuit diagram of a seismograph amplifier utilizing the instant invention for controlling the gain in amplification as derived therefrom;

Figure 2 is a curve which has been plotted with gain in amplification as ordinates and frequency as abscissae, showing the manner in which the gain in amplification derived from the amplifier under a particular condition varies with frequency;

Figure 3 is a curve plotted with the same coordinates as Figure 2 showing the manner in which the gain in amplification varies with an adjustment which is the extreme opposite of that used to produce the curve shown in Figure 2;

Figure 4 is a curve plotted to the same coordinates as Figures 2 and 3 showing the variation in gain as derived from the amplifier, with frequency under still another condition; and Figure 5 is still another curve plotted to the same coordinates as Figures 2, 3 and 4 which illustrates still another adjustment of the elements of the amplifier circuit to produce a desired variation in gain with frequency.

Referring to the drawing in detail, particularly Figure 1, there is shown a detail circuit diagram of a seismograph amplifier utilizing the principles of the instant invention. In this diagram signals generated by a geophone, not shown, are introduced at the terminals 10 and 11. These signals are impressed on the grid 12 of the thermionic tube 13. Tube 13 is a multiple element tube having a cathode 14, control grid 12, auxiliary grid 15, a screen 16 and a plate 17a. Plate potential for this tube is supplied from the terminal marked B+ through the conductor 17, choke 18, conductor 19, conductor 20 and resistance 21. The screen potential for tube 13 is supplied through the same conductors to the point 22, then through the top portion of resistance 23 and conductors 24 and 25. The control grid potential which serves as a bias for tube 13 is the drop produced across the resistance 26. Signals passing through the amplifying tube 13 are conducted through the condenser 27 to the grids 28 and 29 of the dual triode type tube 30. Grids 28 and 29 of tube 30 are connected in parallel. The plate circuits and cathode circuits of tube 30 are separate. Plate 31 of tube 30 delivers signals through the condenser 32 to grid 33 of a second dual triode type tube 34. Plate 35 of tube 30 delivers signals through the condenser 36 to grid 37 of tube 34. The cathodes of tube 34 are connected in parallel and to ground at 38 through a conventional resistance and condenser 39 and 40 respectively. Both tubes 30 and 34 receive their plate potential from the same source of supply marked B+. The potential is supplied to tube 30 through the conductor 17 and resistances 41 and 42 while the plate potential for tube 34 is supplied from B+ through the resistance 43. Signals passing through the three tubes are amplified and taken off at the point 44 and recorded by means of a conventional recording galvanometer, not shown. Tube 34, receiving signals on its respective grids from the separate plate circuits of tube 30, acts as an assimilating means whereby the signals are brought together for recording.

The cathodes 45 and 46 of tube 30 are connected to separate circuits. Both circuits are provided with the conventional self-biasing elements comprising the condenser 47 and resistance 48 for one and the condenser 49 and the resistance 50 for the other. The two cathode circuits are connected together by means of a decoupling resistance 51. The circuit of cathode 45 of the tube 30 also includes a condenser 52 and resistances 53 and 54. Resistances 53 and 54 have shunted across them in variable relationship to them condensers 55 and 56 thereby forming a capacitative impedance in the circuit of this cathode. In the circuits of cathode 46 of tube 30 there is also disposed a condenser 57 and resistances 58 and 59 all connected in series. Superimposed across the resistances 58 and 59 but connected in variable relationship with the two resistances is an inductance 60. The center points between resistances 53 and 54 and resistances 58 and 59 are connected through the conductors 61 and 62 respectively and conductor 63 to ground. There is also connected in the circuit of cathode 45 of tube 30 between the resistance 54 and ground, a resistance 64 having a variable tap 65 thereon by means of which voltages of a selective order can be impressed upon the grid 66 of tube 67. Tube 67 is also of the dual triode type. There is connected in the circuit of cathode 46 of tube 30 between resistance 59 and ground, a resistance 68 that is also provided with a variable tap 69 by means of which signal voltages can be taken off and impressed on the grid 70 of tube 67.

The plate potential for tube 67 is supplied through the conductor 17, choke 18, conductor 19 and resistance 71 to plate 72, of tube 67. The path of plate potential supplied to plate 73 of tube 67 is the same as that described in connection with plate 72 up to the point 74. From this point it is fed through the resistance 75 to plate 73. Plate potential is also supplied in this manner through resistance 75 and the conductors 76 and 77 respectively to plate contacts 78 and 79 of tube 80, which is a dual diode rectifying tube. The outputs from the plates of tube 67 are impressed on the plates 81 and 82 of tube 80. In passing through tube 80, the signals are rectified to a direct current voltage which is conducted through the conductors 83 and 84 to an auxiliary grid 15 in tube 13 where it will produce an expansion in the gain in amplification as derived from that tube.

The operation of this circuit is based on degeneration in the cathode circuits of the dual triode tube 30. If resistances are introduced in the cathode circuits then voltages developed by the tube will appear across the cathode resistances. This voltage in the cathode circuits is out of phase with the voltage developed in the tube so that degeneration takes place and the mu of the tube 30 is reduced. The plate load resistors are made small compared to the cathode resistances so that a greater part of the developed voltages appear in the cathode circuits. Since one of the cathode circuits of tube 30 includes the inductance 60 shunted across resistances 58 and 59, the impedance is low at low frequency, therefore there is little or no degeneration of signals at low frequencies.

In the other cathode circuit of tube 30 the condensers 55 and 56 are shunted across the resistances 53 and 54. If the condensers are selected of proper value, the impedance for higher frequencies will be reduced so that control of the passage of higher frequencies can be obtained. This effect is best illustrated with reference to Figures 2, 3, 4 and 5. In Figure 2 there is shown a curve which has been plotted with gain in amplification as ordinates and frequency as abscissae. This curve resulted from introducing all of the inductance 60 into the cathode circuit of cathode 46 of tube 30 and cutting out all of the capacity of the same tube. It will be noted that for low frequencies, maximum gain of amplification is obtained and as the frequency is increased, the gain in amplification drops off sharply. The curve of Figure 3, plotted with the same coordinates, illustrates the same effect produced with all of the inductance cut out and all of the capacity cut in. It will be noted that this curve is substantially the opposite of that illustrated in Figure 2, that is, the gain for low frequency is maximum, increasing with increasing frequency. The curve in Figure 4, plotted with the same coordinates, illustrates the effect produced by cutting out all of the inductance as well as all of the capacity. This curve simulates the characteristics one would expect from a conventional amplifier. Figure 5, still another curve plotted to the same coordinates, is the opposite to the curve of Figure 4, that is, all of the inductance was introduced into one of the cathode circuits and all of the capacity introduced into the other cathode circuit.

From these four curves which are representative of extreme adjustments of the capacity and inductance in the cathode resistance of tube 30, it is apparent that any in-between values by proper adjustment can be obtained. These curves serve well to represent the expansion control voltage obtainable by means of cathode degeneration.

In seismic prospecting the predominant frequency for reflected waves in the particular area is ascertained and adjustments of the inductance 60 and capacity 56 made relative to their respective resistances. These elements then serve as a filter network which will pass with maximum efficiency the selected frequency band which is that of the reflected waves. These voltage signals passing on through the dual triode tube 67 are amplified and rectified by tube 80 and used as a positive bias potential for tube 13 to produce an expansion of the gain in amplification as derived from this tube.

Thus it can be seen that the advent of inverse feedback makes it possible to construct an expander that will operate on a selected band of frequencies and that the operation of the circuit is based upon the fact that variations of the bias potential on the tube 13 will result in gain variations.

The variable taps on resistances 53 and 54 as well as on resistances 58 and 59 should be ganged for simultaneous operation so that either the inductance or the capacity can be varied at will, separately or simultaneously. Part of the voltages developed across the cathodes in the circuits of cathode 45 or 46 of tube 30 is applied directly to the tube 13 and part through tubes 67 and 80 to the auxiliary grid of tube 13. It will be noted that tubes 67 and 80 have a push-pull type connection so that they will operate in a push-pull manner for cancelling any distortion developed.

In operation signals of selected frequencies are divided at the tube 30 and a portion of the signal voltages travel directly on through tube 34 where they are amplified and recorded while the other portion of the signals impressed on tube 30 passes through the cathode circuits of this tube where degeneration of undesired frequencies occurs and selected frequencies amplified, rectified and used to control the gain in amplification as derived from the tube 13. In this manner an expander is produced which will operate to expand the gain imparted to the waves of selected frequencies and at the same time produce deterioration of the undesired frequencies.

I claim:

In a seismograph circuit having means for detecting seismic waves by generating electrical signals corresponding to the seismic waves, said signals being of a plurality of definite frequencies, thermionic tube amplifying means for amplifying the electrical signals of all of the frequencies, and means for recording the electrical signals in coordination with time, the improvement which comprises means for diverting a portion of the signals passing through the amplifier, a filter for suppressing the signals of undesirable frequencies from the diverted portion of the signals, means for rectifying the signal voltages of the selected frequency, and means for applying the rectified voltages to the control grid of at least one of the thermionic amplifier tubes to control the gain in amplification imparted to all signals passing through that tube independent of their frequencies.

MALCOLM D. McCARTY.